United States Patent [19]

Araki

[11] Patent Number: 5,436,823
[45] Date of Patent: Jul. 25, 1995

[54] PARALLEL OPERATION CONTROLLER FOR POWER CONVERTERS

[75] Inventor: Hiroshi Araki, Inazawa, Japan

[73] Assignee: Mitsubishi Denki Kabushiki Kaisha, Tokyo, Japan

[21] Appl. No.: 80,108

[22] Filed: Jun. 23, 1993

[30] Foreign Application Priority Data

Jun. 24, 1992 [JP] Japan .................................. 4-165801

[51] Int. Cl.⁶ ......................................... H02M 7/5387
[52] U.S. Cl. ......................................... 363/71; 363/98; 363/56; 307/51; 307/58; 307/82
[58] Field of Search ....................... 363/71, 95, 98, 56; 307/51, 58, 82

[56] References Cited

U.S. PATENT DOCUMENTS

| | | | |
|---|---|---|---|
| 4,670,832 | 6/1987 | Park | 363/98 |
| 4,717,833 | 1/1988 | Small | 363/71 |
| 4,737,897 | 4/1988 | Shipley et al. | 363/71 |
| 4,748,340 | 5/1988 | Schmidt | 363/71 |
| 4,802,079 | 1/1989 | Mizoguchi | 363/71 |
| 4,947,310 | 8/1990 | Kawabata et al. | 363/71 |
| 5,016,158 | 5/1991 | Matsui et al. | 363/71 |
| 5,130,617 | 6/1992 | Oshima et al. | 363/71 |
| 5,191,519 | 3/1993 | Kawakami | 363/71 |
| 5,212,630 | 5/1993 | Yamamoto et al. | 363/71 |
| 5,257,180 | 10/1993 | Sashida et al. | 363/71 |
| 5,262,935 | 11/1993 | Shirahama et al. | 363/71 |
| 5,325,285 | 6/1994 | Araki | 363/71 |

FOREIGN PATENT DOCUMENTS

56-10080 2/1981 Japan .
60-102878 6/1985 Japan .
63-287371 1/1988 Japan .

*Primary Examiner*—R. Skudy
*Assistant Examiner*—Shawn Riley
*Attorney, Agent, or Firm*—Leydig, Voit & Mayer

[57] ABSTRACT

A parallel operation controller for power converters which performs parallel operation control of a plurality of power converters having input terminals connected to a DC voltage source and output terminals connected to each other through reactors. The parallel operation controller includes: three-arm modulation control signal generating devices for generating three-arm modulation control signals each serving as a voltage command value for each phase of corresponding power converters; a voltage fixing period determining circuit which selects, on the basis of a three-arm modulation control signal from one of the three-arm modulation control signal generating devices, a phase fixing the voltage level thereof to a predetermined DC voltage level, and determines a period in which the voltage level is fixed. This parallel operation controller reduces the amount of circulating currents which flow between phases of unit inverters.

6 Claims, 7 Drawing Sheets

PARALLEL OPERATION CONTROLLER FOR POWER CONVERTERS

FIELD OF THE INVENTION

This invention relates to a parallel operation controller for power converters in which a plurality of unit inverters, i.e., power converters, are connected in parallel so as to perform parallel operation with current balance control.

DESCRIPTION OF THE RELATED ART

Figure 4:
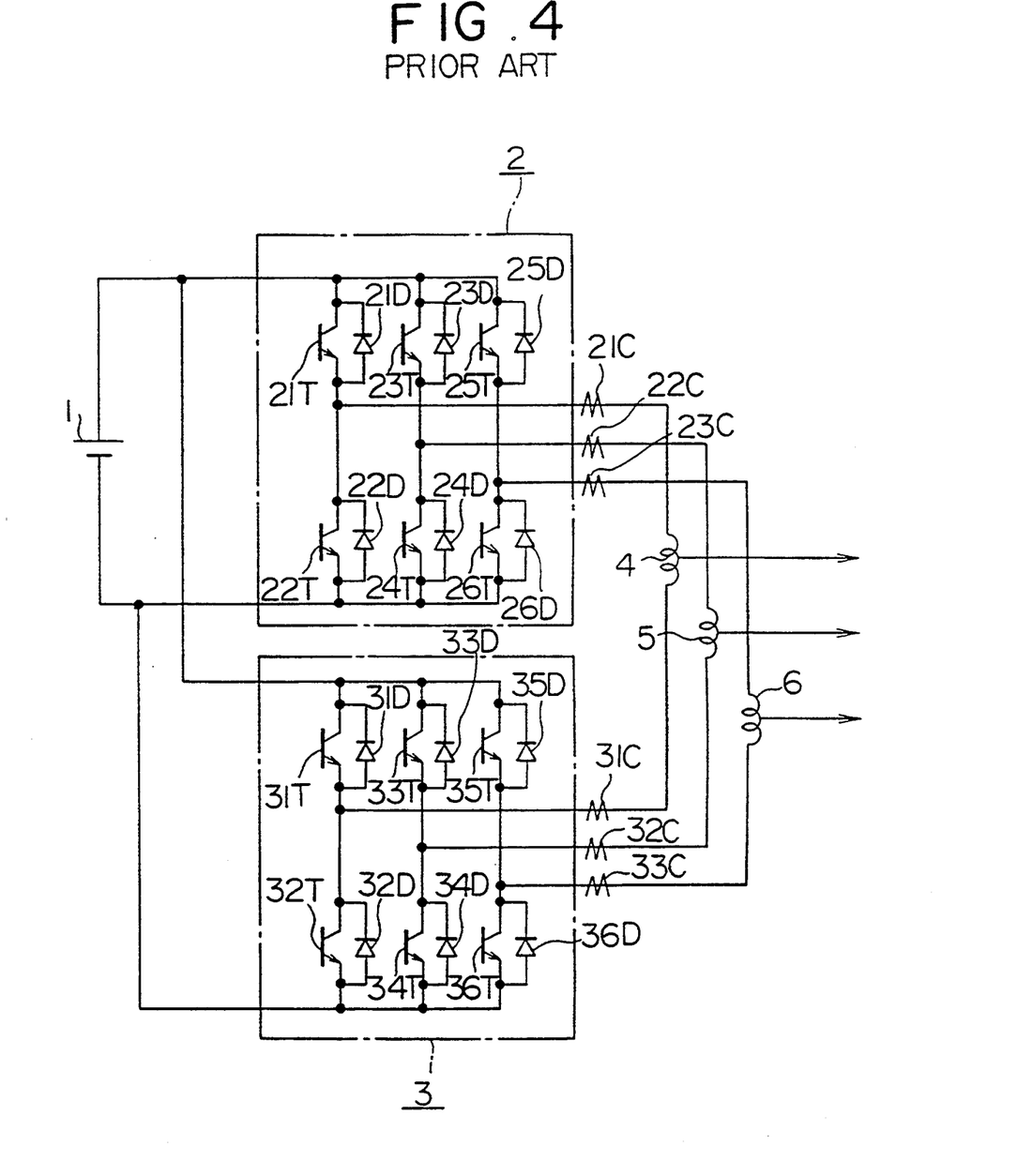
FIG. 4 is a circuit diagram showing the circuit configuration of a conventional parallel operation controller.

FIG. 4 is a diagram showing the construction of a conventional parallel operation controller for power converters in which two unit inverters are connected in parallel. In the drawing, numeral 1 indicates a DC voltage source for supplying an input voltage to a voltage-type inverter; and numerals 2 and 3 indicate first and second unit inverters constituting the voltage-type inverter and adapted to convert the input DC voltage from the DC voltage source to an AC voltage and output the same. In the first unit inverter 2, numerals 21T through 26T indicate transistors in a three-phase-bridge connection; and numerals 21D through 26D indicate commutation diodes connected in parallel to the transistors 21T through 26T. Similarly, in the second unit inverter 3, numerals 31T through 36T indicate transistors; and numerals 31D through 36D indicate commutation diodes.

Numerals 21C through 23C indicate current transformers respectively connected to an output terminal of each phase of the first unit inverter 2; numerals 31C through 33C indicate current transformers respectively connected to the output terminal of each phase of the second unit inverter 3; and numerals 4, 5 and 6 indicate interphase reactors connected between the in-phase output terminals of the unit inverters 2 and 3.

Next, an outline of the operation of this parallel operation controller for power converters, shown in FIG. 4, will be described.

The first and second unit inverters 2 and 3 are connected to the common DC power source 1, and the output terminals of the first and second unit inverters 2 and 3 are connected in parallel to each other through the interphase reactors 4, 5 and 6. Provided on the output side of the first and second unit inverters 2 and 3 are the current transformers 21C through 23C and 31C through 33C for detecting the output currents from the unit inverters, which current transformers are needed for balancing the output currents of these unit inverters.

Figure 5:
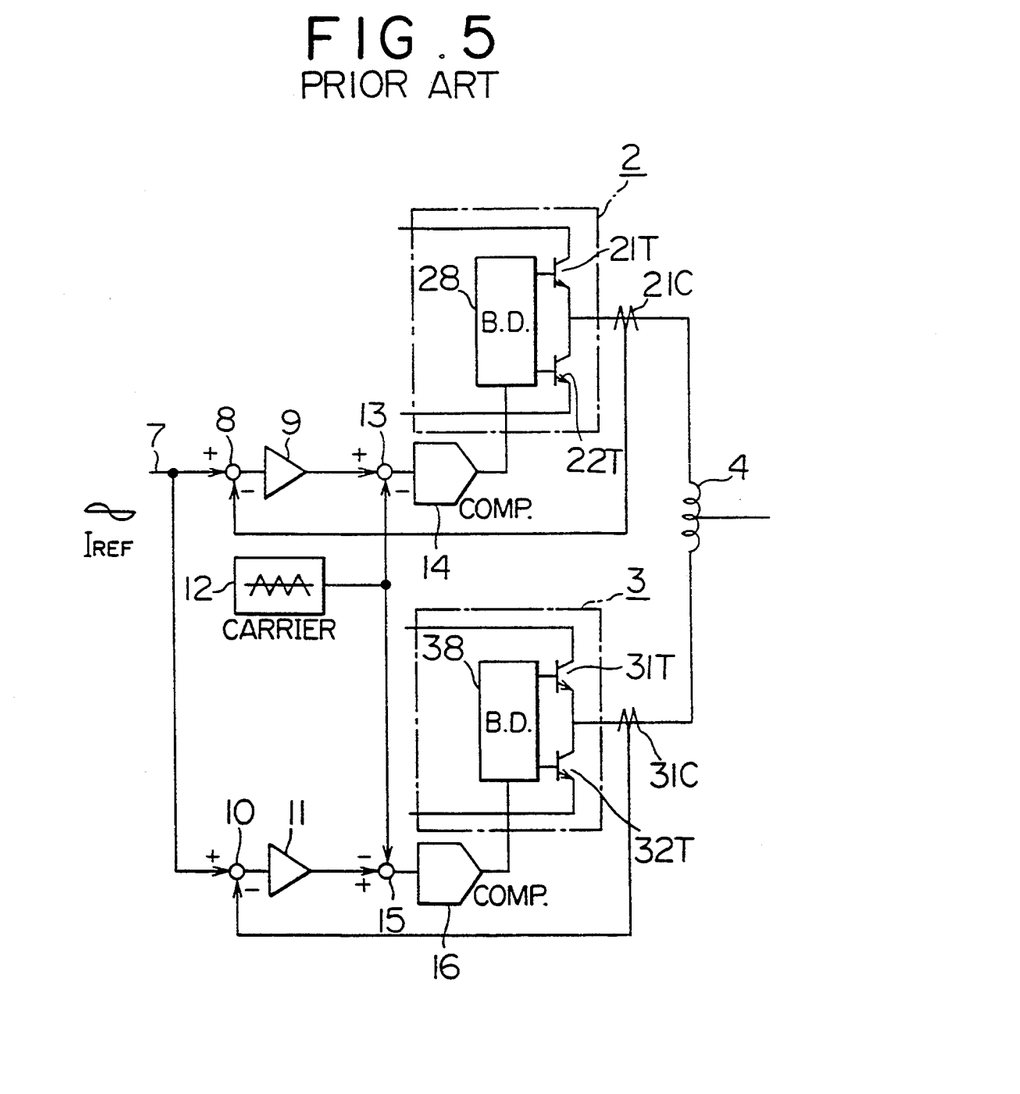
FIG. 5 is a block diagram showing a conventional parallel operation controller.

A current balance controlling operation for this parallel operation controller for power converters, constructed as described above, will be described with reference to FIG. 5. In FIG. 5 a concrete circuit diagram showing the construction of a portion corresponding to one phase of a conventional power converter of a current balance-control type shown, for example, in "Type Extension of High-Performance Inverter Drive Series for Systems" No. 2, 1987, pp. 105–112, published by Yasukawa Electric Mfg. Co., Ltd.). The components which are the same as or equivalent to those of FIG. 4 are indicated by the same reference numerals. Referring to FIG. 5, numeral 28 indicates a base drive circuit for ON/OFF control of the transistors 21T and 22T; and numeral 38 indicates a base drive circuit for ON/OFF control of the transistors 31T and 32T.

Numeral 7 indicates a current reference command input from the outside; and numeral 8 indicates a subtracter which takes the difference between the current reference command 7 and an inverter output current output from the current transformer 21C, which is provided on the output side of the first unit inverter 2. Numeral 9 indicates a current controller which varies a three-arm modulation-control- signal output in such a way that the inverter output current is conformed to the current reference command 7.

Similarly, numeral 10 indicates a subtracter which takes the difference between the current reference command 7 and an inverter output current output from the current transformer 31C, which is provided on the output side of the second unit inverter 3. Numeral 11 indicates a current controller which varies a three-arm modulation control signal output in such a way that the inverter output current is conformed to the current reference command 7.

Numerals 13 and 15 indicate subtracters which obtain the deviation between the level of a triangular wave signal output from a triangular wave generator and the levels of three-arm modulation control signals, which are the outputs of the current controllers 9 and 11. Numerals 14 and 16 indicate comparators which generate PWM commands to be supplied to the base drive circuits 28 and 38 in accordance with the deviation obtained by the subtracters 13 and 15.

Next, the current balance control with the above construction will be described in detail. First, the deviation between the current reference command 7, input from the outside, and the inverter output current detected on the output side of the unit inverter 2 is obtained by the subtracter 8, and this deviation is input to the current controller 9. The current controller 9 varies the three-arm modulation control signal on the basis of the deviation thus input.

The output of the current controller 9 is input to the subtracter 13 along with the triangular wave signal, which is the output of the triangular wave generator 12, to thereby obtain the deviation between the output levels. This deviation is input to the comparator 14, which is on the output side, whereby a PWM command to be supplied to the base drive circuit 28 is obtained. On the basis of this PWM command, output from the comparator 14, the base drive circuit 28 turns ON/OFF the transistors 21T and 22T, which constitute the first unit inverter 2.

As for the second unit inverter 3, it also performs a control similar to that of the first unit inverter 2. By thus effecting current balance control, the output currents of the first and second unit inverters 2 and 3 become conformed to the current reference command 7, with the result that the output currents of the two unit inverters 2 and 3 are balanced.

Figure 6:
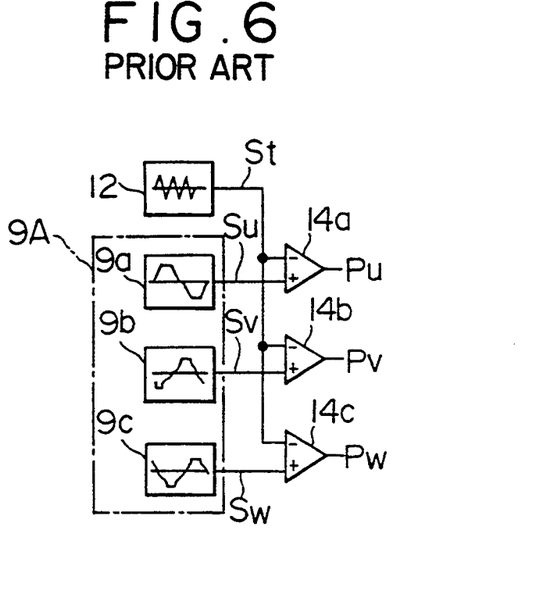
FIG. 6 is a circuit diagram showing a conventional two arm modulation control signal generating circuit.

Next, an example in which a two-arm modulation system is employed in the first unit inverter will be described with reference to FIGS. 6 and 7. Since the second unit inverter 3 operates the same way as the first unit inverter 2, a description of the second inverter 3 in this connection will be omitted. FIG. 6 is a circuit diagram showing a modulation circuit in which the two-arm modulation system is adopted. FIG. 7 is a signal waveform diagram showing the signal waveforms of the different sections of the modulation circuit shown in FIG. 6. Referring to FIG. 6, numeral 9A indicates a two-arm modulation control signal generator, which includes signal generating sections 9a through 9c for generating a two-arm modulation control signal for each phase. Numerals 14a through 14c indicate comparators for comparing a triangular wave signal ST output from a triangular wave signal generator 12 with two-arm modulation control signals Su, Sv and Sw. The two-arm modulation control signal generator 9A takes in the three-arm modulation control signals, which are output from the current controllers 9 and 11 shown in FIG. 5, and generates signals obtained by correcting the three-arm modulation control signals to two-arm modulation control signals Su, Sv and Sw.

As shown in FIG. 7, in the two-arm modulation system, one cycle of the two-arm modulation control signal is divided into six equal sections, and two-arm modulation control signals Su−Sw which will fix one of the three arms of the unit inverters constituting the voltage-type inverter to one of the polarities of the DC power source in each of the above six sections, are generated by the two-arm modulation control signal generator 9A, and, by comparing, by means of the comparators 14a through 14c, these two-arm modulation control signals Su−Sw with the triangular wave signal ST generated by the triangular wave generator 12, the PWM commands Pu, Pv and Pw are obtained. That is, within one carrier (triangular wave) period, one of the three arms is fixed to one of the two polarities of the DC power source, and switching is effected on the two remaining arms, once for each of the upper and lower arms, two times in total, whereby a desired output voltage is obtained.

Thus, briefly, the two-arm modulation system is a system in which the voltage of one arm is fixed (saturated) and only the remaining two arms are modulated during a particular period (for example, 60°) of one cycle, i.e., control is effected in such a way that the line voltage exhibits a desired waveform while distorting the electric potential of each phase.

The number of times the switching is performed in the two-arm modulation system is reduced to ⅔ of that in the three-arm modulation system, which uses the same carrier frequency.

An explanation of the two-arm modulation system is to be found, for example, in "Semiconductor Power Conversion Circuit" pages 110, 111 and 125, published by the corporation, Institute of Electrical Engineers, March, 1987.

When the two-arm modulation system is adopted for each unit inverter of this conventional parallel operation controller, constructed as described above, a particular period in which the voltage level is fixed has been set individually for each unit inverter, thereby saturating the voltage level of one arm. Thus, the particular period for voltage level saturation is different for different unit inverters, so that a large circulating current flows between the phases of the unit inverters, resulting in the inverters being damaged, or large interphase reactors being required so as to restrain circulating current.

SUMMARY OF THE INVENTION

This invention has been made with a view toward solving the above problems. It is accordingly an object of this invention to provide a parallel operation controller for power converters which allows the size of the interphase reactors to be diminished and which is capable of performing a stable control of the parallel operation of the inverters.

In accordance with this invention, there is provided a parallel operation controller for power converters of the type which performs parallel operation control of a plurality of power converters whose input terminals are connected to a DC voltage source and whose output terminals are connected to each other through reactors, the parallel operation controller comprising:

a plurality of three-arm modulation control signal generating means for generating three-arm modulation control signals respectively serving as a voltage command value for each phase of corresponding power converters; voltage fixing period determining means which selects, on the basis of a three-arm modulation control signal generated by one of the plurality of three-arm modulation control signal generating means, a phase fixing the voltage level thereof to a predetermined DC voltage level, and determines a period of time in which the voltage level is fixed;

a plurality of two-arm modulation control signal generating means each of which generates a fixed voltage command value corresponding to the phase selected by the voltage fixing period determining means, and corrects, of the three-arm modulation control signals generated by the three-arm modulation control signal generating means, those three-arm modulation control signals which correspond to the other two phases so as to change them into two-arm modulation control signals; and a plurality of PWM signal generating means each of which generates PWM signals on the basis of the voltage command value and the two-arm modulation control signals generated by the corresponding two-arm modulation control signal generating means and supplies them to the corresponding power converter.

DESCRIPTION OF THE PREFERRED EMBODIMENTS

Figure 1:
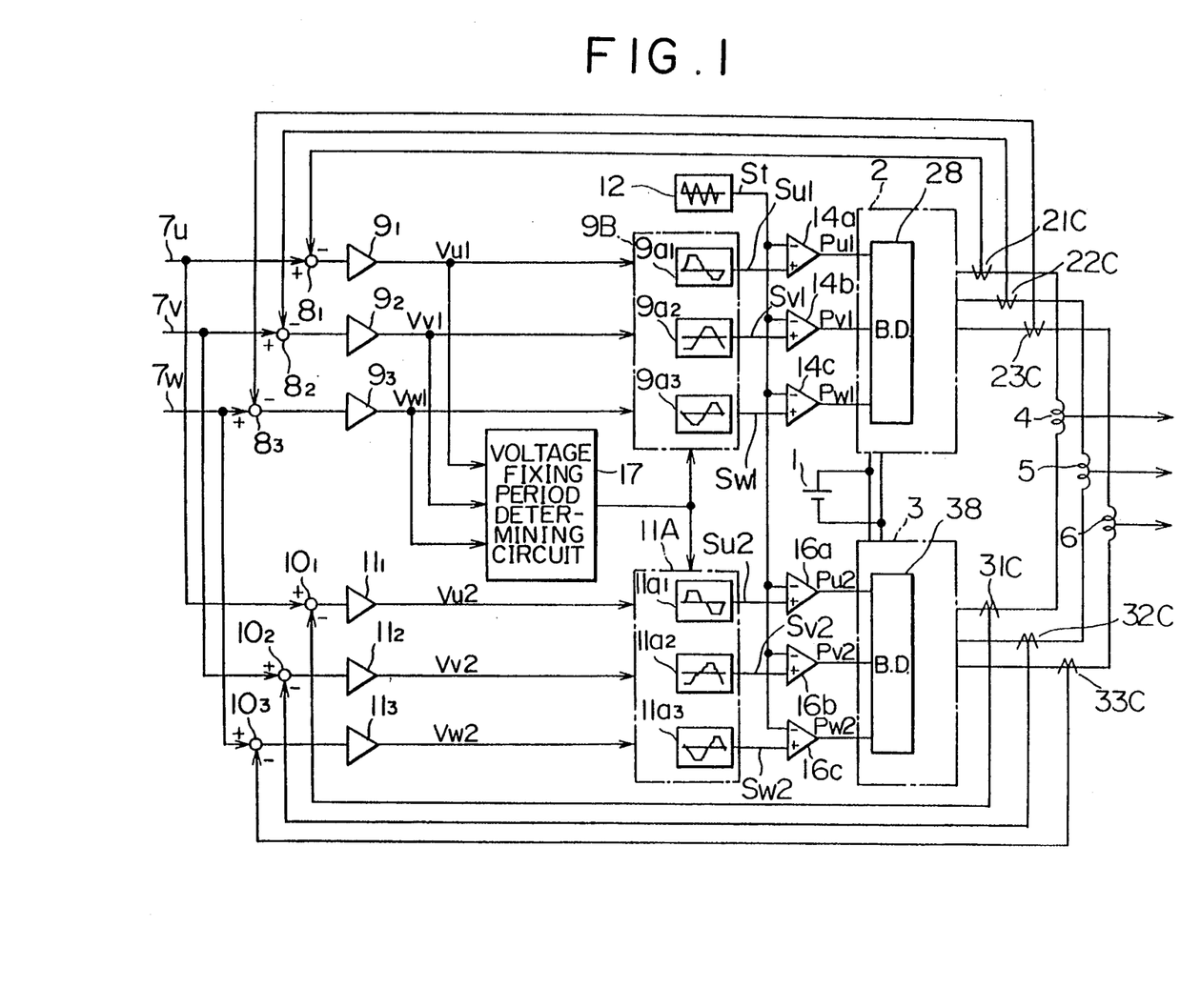
FIG. 1 is a block diagram showing a parallel operation controller for power converters according an embodiment of this invention.

A preferred embodiment of this invention will now be described. Referring to FIG. 1, a DC voltage source 1 is connected to first and second unit inverters 2 and 3. The first and second unit inverters 2 and 3 include a plurality of transistors (not shown) and a plurality of commutation diodes (not shown), and have base drive circuits 28 and 38 for ON/OFF control of these transistors.

Current transformers 21C, 22C and 23C are respectively connected to the output terminal of each phase of the first unit inverter 2, and current transformers 31C, 32C and 33C are respectively connected to the output terminal of each phase of the second unit inverter 3. Current controllers $9_1$–$9_3$ are respectively connected to the current transformers 21C through 23C through subtracters $8_1$–$8_3$, respectively, and current controllers $11_1$–$11_3$ are respectively connected to the current transformers 31C through 33C through subtracters $10_1$–$10_3$, respectively.

Connected to the current controllers $9_1$–$9_3$ is a two arm modulation control signal generator 9B, and connected to the current controllers $11_1$–$11_3$ is a two-arm modulation control signal generator 11A. The generator 9B includes signal generating sections 9$a$1, 9$a$2 and 9$a$3 corresponding to the U, V and W-phases, respectively. The generator 11A includes signal generating sections 11$a$1, 11$a$2 and 11$a$3 corresponding to the U, V and W-phases, respectively.

The base drive circuit 28 of the first unit inverter 2 is connected to the signal generating sections 9$a$1–9$a$3 of the generator 9B through comparators 14$a$ through 14$c$, respectively, and the base drive circuit 38 of the second unit inverter 3 is connected to the signal generating sections 11$a$1 through 11$a$3 of the generator 11A through comparators 16$a$ through 16$c$, respectively. Further, a triangular wave generator 12 is connected to each of the comparators 14$a$ through 14$c$ and 16$a$ through 16$c$.

Figure 1A:
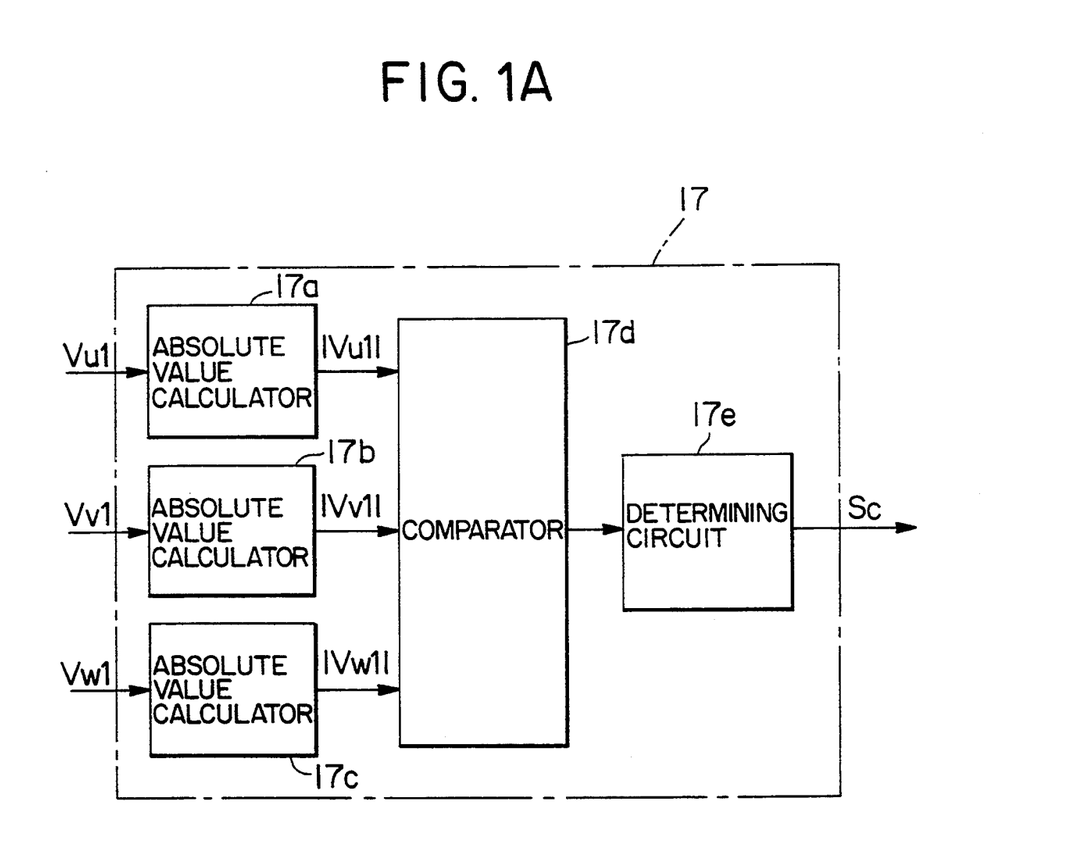
FIG. 1A is a block diagram depicting a voltage fixing period determining circuit according to an embodiment of this invention.

A voltage fixing period determining circuit 17 is connected to the output terminals of the current controllers $9_1$–$9_3$. Referring to FIG. 1A, voltage fixing period determining circuit 17 comprises absolute value calculators 17$a$–17$c$ connected to current controllers $9_1$–$9_3$, respectively. A comparator 17$d$ is connected to absolute value calculators 17$a$–17$c$ to compare their outputs. A determining circuit 17$e$ is connected to the comparator 17$d$ for fixing the voltage level of the arms. The output terminal of the voltage fixing period determining circuit 17 is connected to the two-arm modulation control signal generators 9B and 11A.

Next, the operation of this embodiment will be described. First, the three-phase alternating current of the first unit inverter 2 of the power converter is detected by the current transformers 21C through 23C. The subtracters $8_1$–$8_3$ calculate the deviations between the alternating current detected by the current transformers 21C, 22C and 23C and the current reference commands 7$u$, 7$v$ and 7$w$ input from the outside. The current controllers $9_1$–$9_3$ output three-arm modulation control signals Vu1, Vv1 and Vw1 in such a way that the deviations calculated by the subtracters $8_1$–$8_3$ become small, i.e., the three-phase alternating current of the unit converter 2 becomes conformed to the current reference commands 7$u$ through 7$w$.

Figure 2:
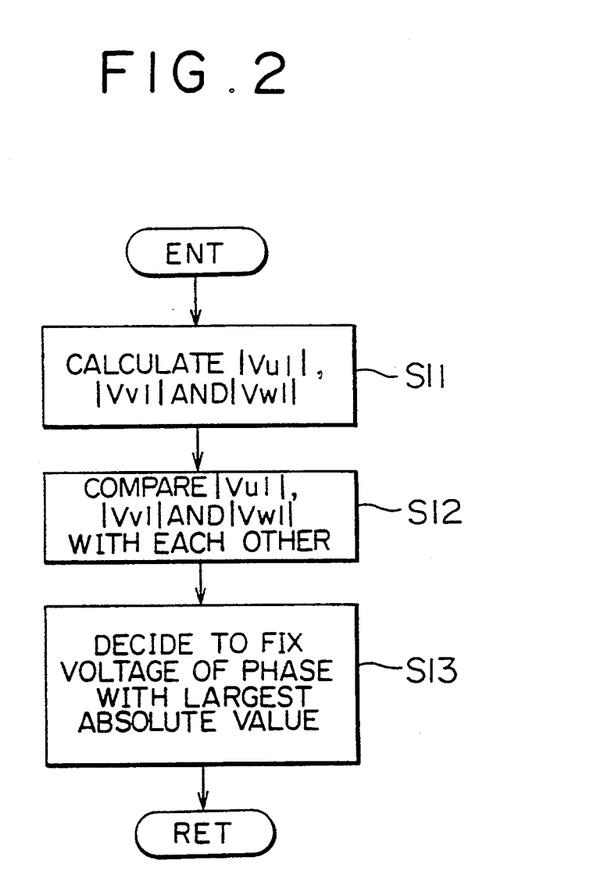
FIG. 2 is a flowchart showing the operation of the voltage fixing period determining circuit depicted in FIG. 1.

These three-arm modulation control signals, Vu, Vv1 and Vw1, are taken in by the voltage fixing period determining circuit 17, and their absolute values |Vu1|, |Vv1| and |Vw1| are calculated in step S11 of the flowchart shown in FIG. 2. Subsequently, in step S12, these absolute values, |Vu1|, |Vv1| and |Vw1|, are compared with each other. Then, in step S13, a decision is made to fix the voltage level of the arm corresponding to the phase which has output the modulation control signal of the largest absolute value, and an instruction signal Sc indicating to that effect is supplied from the voltage fixing period determining circuit 17 to the two-arm modulation control signal generator 9B.

The above procedures of steps S11 to S13 are repeatedly conducted on a cycle which is much shorter than those of the three-arm modulation control signals Vu1, Vv1 and Vw1. If, in this process, the absolute value of the U-phase three-arm modulation control signal, Vu1, is the largest N times in succession, a decision is made to fix the voltage level of the arm corresponding to the U-phase to one of the two polarity levels of the DC voltage source 1 during a period corresponding to N cycles.

Figure 7A:
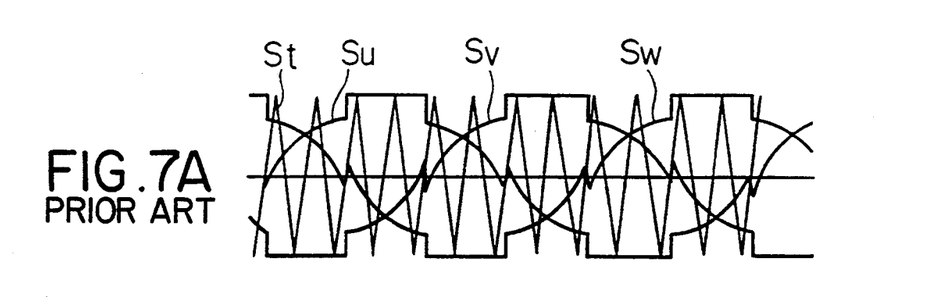
FIG. 7A is a signal waveform diagram illustrating the operation of the circuit of FIG. 6.
Figure 7B:
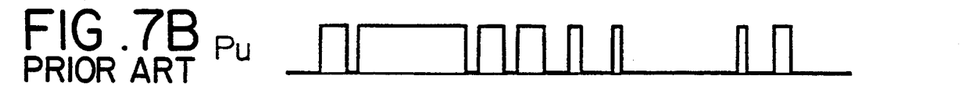
Figure 7C:
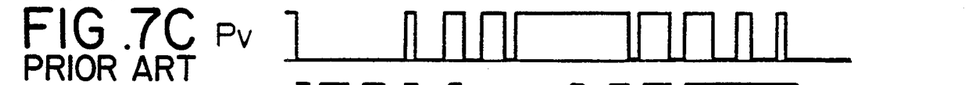
Figure 7D:
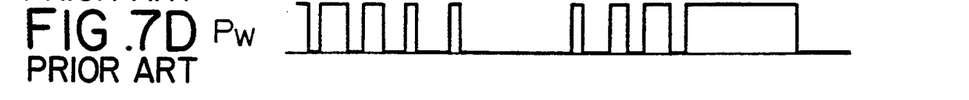

Next, the two-arm modulation control signal generator 9B, which has received the instruction signal Sc from the voltage fixing period determining circuit 17, generates two-arm modulation control signals Su1, Sv1 and Sw1 in the following manner: For example, when fixing the voltage level of the arm corresponding to the U-phase by the instruction signal, the generator 9B sets, in step S21 of the flowchart of FIG. 3, a fixing voltage command value corresponding to one of the polarity levels of the DC voltage source 1 with respect to the U-phase two-arm modulation control signal, Su1. That is, as shown in FIG. 7A, during the voltage fixing period, the voltage of that arm is maintained at a level higher than that of the triangular wave signal generated by the triangular wave generator 12.

Figure 3:
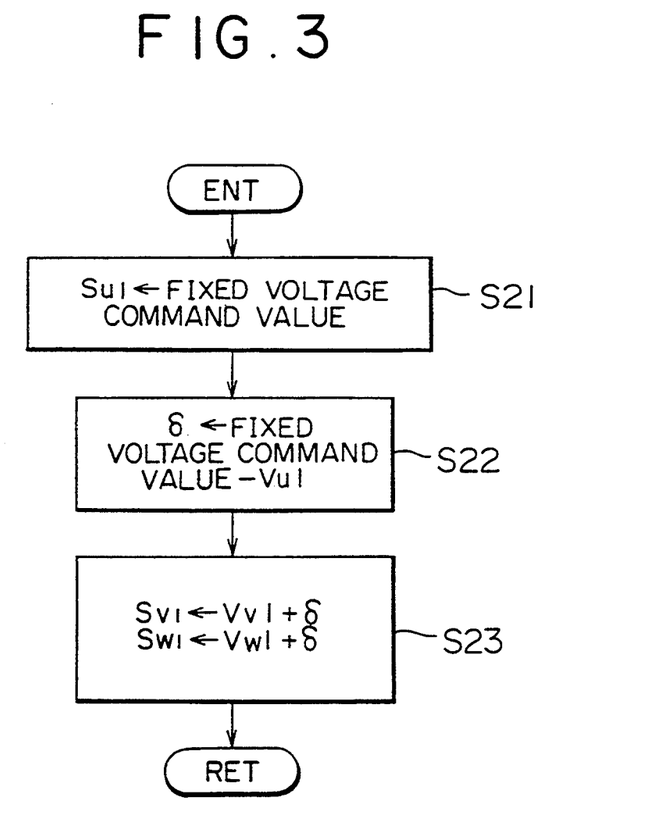
FIG. 3 is a flowchart showing the operation of a two-arm modulation control signal generating circuit in this embodiment.

When the voltage level of the U-phase two-arm modulation control signal, Su1, has been fixed in this way, the difference δ between the fixing voltage command value and the three-arm modulation control signal Vu1 is calculated in step S22. Further, in step S23, the difference δ is added to the remaining three-arm modulation control signals, Vv1 and Vw1, whereby a V-phase two-arm modulation control signal Sv1 and a W-phase two-arm modulation control signal Sw1 are formed.

After this, the two-arm modulation control signals Su1, Sv1 and Sw1, generated by the generator 9B, are compared, by means of the comparators 14$a$, 14$b$ and 14$c$, with the triangular wave signal generated by the triangular wave generator 12, whereby PWM commands Pu1, Pv1 and Pw1 are respectively output from the comparators 14$a$, 14$b$ and 14$c$ to the base drive circuit 28 of the unit inverter 2, thereby effecting ON/OFF control of the plurality of transistors of the unit inverter 2. The voltage level of the control signal of one phase is fixed and, at the same time, the control signals of the remaining two phases are corrected in such a way that the line voltage between them and the control signal with the fixed voltage level is the same as that of the original three-arm control signals. Then, PWM-modulation control of the three-phase-voltage type unit inverter 2 is effected solely with two arms. PWM modulation control of the second unit inverter 3 is effected in the same way as in the first unit inverter 2.

The three-phase alternating current of the second unit inverter 3 is detected by the current transformers 31C through 33C. The deviation between this current and the current reference commands 7$u$ through 7$w$ is calculated by the subtracters 101 through 103 and three-arm modulation control signals Vu2 through Vw2 are output by the current controllers $11_1$–$11_3$.

These three-arm modulation control signals, Vu2, Vv2 and Vw2, are converted to two-arm modulation control signals Su2, Sv2 and Sw2 by the two-arm modulation control signal generator 11A. At this time, the instruction signal determining the voltage fixing period has been input to the two-arm modulation control signal generator 11A from the voltage fixing period determining circuit 17. That is, in accordance with the voltage fixing period determined on the basis of the three-arm modulation control signals Vu1, Vv1 and Vw1 of the first inverter 2, the conversion to the two-arm modulation control signals Su2, Sv2 and Sw2 is effected, whereby synchronization in voltage fixing period is attained in the first and second unit inverters 2 and 3. Subsequently, the two-arm modulation control signals Su1 through Sw1 are compared with the triangular wave signal by the comparators 16a to 16c to generate PWM commands Pu2 to Pw2, which are supplied to the base drive circuit 38 of the unit inverter 3.

As described above, in accordance with this embodiment, synchronization in voltage fixing period with respect to a particular phase can be effected between the unit inverters 2 and 3. Therefore, there is no difference in output voltage between the corresponding phases of the unit inverters 2 and 3, thereby restraining circulating current. As a result, the interphase reactors can be made smaller, thereby reducing the price and size of the apparatus as a whole.

While in the above embodiment three-phase voltage type inverters using transistors were employed, the present invention is not restricted to this type of inverter. For example, the present invention is also applicable to the parallel operation control of transistor converters. Further, the present invention is also applicable to a case where three or more unit inverters are operated in parallel. In that case, it is only necessary that the corresponding phase outputs of the plurality of unit inverters be commonly connected by reactors.

What is claimed is:

1. A parallel operation controller for power converters of the type which performs parallel operation control of a plurality of power converters whose input terminals are connected to a DC voltage source and whose output terminals are connected to each other through reactors said parallel operation controller comprising:
   a plurality of three-arm modulation control signal generating means for generating three-arm modulation control signals for first, second and third phases of the power converters, respectively, each modulation control signal serving as a voltage command value for each phase of corresponding power converters;
   voltage fixing period determining means for selecting, on the basis of a three-arm modulation control signal generated by one of said plurality of three-arm modulation control signal generating means, a three-arm modulation control signal of the first phase and for fixing the voltage level of the three-arm modulation control signal of the first phase to a predetermined DC voltage level, and for determining a period of time in which the voltage level is fixed;
   a plurality of two-arm modulation control signal generating means for generating a fixed voltage command value corresponding to the three-arm modulation control signal selected by the voltage fixing period determining means, and for correcting the three-arm modulation control signals of the second and third phases so as to change the corrected three-arm modulation control signals into two-arm modulation control signals; and
   a plurality of PWM signal generating means each of which generates PWM signals on the basis of the voltage command value and the two-arm modulation control signals generated by the corresponding two-arm modulation control signal generating means and supplies the PWM signals to the corresponding power converter.

2. A parallel operation controller according to claim 1 wherein each of said three-arm modulation control signal generating means includes:
   current detecting means for detecting a three-phase alternating current output from the corresponding power converter;
   a subtracter for calculating, for each phase, a difference between the three-phase alternating current detected by said current detecting means and a current reference command value input from outside; and
   a current controller for outputting a three-arm modulation control signal on the basis of the difference calculated by said subtracter.

3. A parallel operation controller according to claim 1 wherein each of said two-arm modulation control signal generating means sets a command value corresponding to one polarity level of the DC voltage source as the fixed voltage command value.

4. A parallel operation controller according to claim 3 wherein each of said two-arm modulation control signal generating means converts the three-arm modulation control signal of the first phase selected by said voltage fixing period determining means to a voltage command value, and corrects the three-arm modulation control signals of the second and third phases in such a way that a line voltage between the corrected three-arm modulation control signals and fixed modulation control signal is equal to a line voltage between the three-arm modulation control signals generated by said three-arm modulation control generating means.

5. A parallel operation controller according to claim 1 wherein said PWM signal generating means includes:
   a triangular wave generator for generating a triangular wave signal; and
   a plurality of comparators each of which compares the voltage command value and the two-arm modulation control signals generated by the corresponding two-arm modulation control signal generating means with the triangular wave signal generated by said triangular wave generator.

6. A parallel operation controller according to claim 4 wherein said voltage fixing period determining means includes first, second and third absolute value circuits corresponding to the first, second and third phases, a comparator connected to the first, second and third absolute value circuits and a determining circuit connected to the comparator that fixes the voltage level of the three-arm modulation control signal having the largest absolute value.

* * * * *